United States Patent
Rodniansky et al.

(10) Patent No.: US 11,303,615 B2
(45) Date of Patent: Apr. 12, 2022

(54) SECURITY INFORMATION PROPAGATION IN A NETWORK PROTECTION SYSTEM

(71) Applicant: International Business Machines Corporation, Armonk, NY (US)

(72) Inventors: Leonid Rodniansky, Allston, MA (US); Tania Butovsky, Needham, MA (US)

(73) Assignee: International Business Machines Corporation, Armonk, NY (US)

( * ) Notice: Subject to any disclaimer, the term of this patent is extended or adjusted under 35 U.S.C. 154(b) by 199 days.

(21) Appl. No.: 16/679,380

(22) Filed: Nov. 11, 2019

(65) Prior Publication Data
US 2021/0144125 A1    May 13, 2021

(51) Int. Cl.
*H04L 29/06* (2006.01)

(52) U.S. Cl.
CPC .......... *H04L 63/0428* (2013.01); *H04L 63/20* (2013.01)

(58) Field of Classification Search
CPC . H04L 63/0428; H04L 63/164; H04L 63/166; H04L 63/20; H04L 63/105; H04W 12/08
USPC .......................................................... 726/1
See application file for complete search history.

(56) References Cited

U.S. PATENT DOCUMENTS

| 7,877,796 B2 | 1/2011 | Smith |
| 10,735,386 B2 * | 8/2020 | Arnold ................ H04L 63/0236 |
| 2012/0011360 A1 | 7/2012 | Engels et al. |
| 2014/0215628 A1 | 7/2014 | Yan |

\* cited by examiner

*Primary Examiner* — Longbit Chai
(74) *Attorney, Agent, or Firm* — Jeffrey S. LaBaw; David H. Judson

(57) ABSTRACT

A network protection system (NPS) is augmented to determine and apply security information for a host on a network. The NPS is configured to monitor the host. In response to an occurrence, e.g., the host requesting a network host address, the NPS dynamically determines the security information and encodes it in a portion of the IP address that is assigned. The particular portion of the IP address that is configured for the security information is identified according to variable-length subnet masking (VLSM) notation and, in particular, by including an additional host identifier subdivision that identifies the portion that carries the relevant security data. The security information (e.g., a rank) is encoded in a bitmask. An IP address that has been extended in this manner is then provided on the network, where it is readily-evaluated by other applications and systems that recover the security information by simply applying the bitmask to the IP address.

18 Claims, 7 Drawing Sheets

```
#define SECURITY_NORMAL            0x00      // Normal
#define SECURITY_SUSPICIOUS_HOST    0x80      // Suspicious
```

```
#define SECURITY_NORMAL            0x00
#define SECURITY_SUSPICIOUS_HOST    0x40
#define SECURITY_LOW_VIOLATOR       0x80
#define SECURITY_HIGH_VIOLATOR      0xC0
```

| ETHERNET: SOURCE=SENDER'S MAC; DESTINATION=CLIENT MAC ADDRESS |||| 
|---|---|---|---|
| IP: SOURCE=192.168.1.1; DESTINATION=255.255.255.255 UDP: SOURCE PORT=67; DESTINATION PORT=68 ||||
| Octet 0 | Octet 1 | Octet 2 | Octet 3 |
| OP | HTYPE | HLEN | HOPS |
| 0x02 | 0x01 | 0x06 | 0x00 |
| XID ||||
| 0x3903F326 ||||
| SEC S || FLAG S ||
| 0x0000 || 0x0000 ||
| CIADDR (CLIENT IP ADDRESS) ||||
| 0x00000000 ||||
| YIADDR (YOUR IP ADDRESS) ||||
| 0xC0A80164 (192.168.1.100) ||||
| ○○○ ||||
| DHCP OPTIONS ||||
| 53: 2 (DHCP OFFER) ||||
| 1 (SUBNET MASK): 255.255.255.0 ||||

FIG. 10

SECURITY INFORMATION PROPAGATION IN A NETWORK PROTECTION SYSTEM

BACKGROUND OF THE INVENTION

Technical Field

This disclosure relates generally to securing resources in a distributed computing environment.

Background of the Related Art

Modern information processing environments typically use an application-server model instead of a traditional client-server model. The application server-based architecture allows each application to perform specific and/or specialized portions of processing before handing a transaction or data stream off to a successive processing tier. An application-server model may utilize a multi-tier arrangement or architecture. In a multi-tier arrangement, each tier is responsible for performing a particular aspect of processing, e.g., database or application tiers can process different data. Different tiers communicate by passing or transmitting data, often according to a predetermined protocol or data structure. A business transaction is therefore passed between tiers, which may be successive layers or nodes in the processing stream. Accordingly, each tier "layer" receives a transaction from a preceding layer.

A multi-tier architecture of this type may include or be associated with a network protection system (NPS). Systems of this type monitor transactions to identify suspicious behavior of network hosts, and they can be configured to associate one or more security classifications, or "security ranks," to the monitored hosts. Thus, for example, the NPS may collect information about security violations of the monitored network hosts and then use that information to classify the hosts according to predefined security ranks, such as "normal" or "suspicious." There are many types of security violations that can influence a network host security rank, such as average number of client authentication failures, access attempts to unauthorized servers, sites, objects or server resources, failures to update certificates and security patches, the use of insufficiently-secure cryptographic methods, failures to encrypt server communications, and many others. Thus, NPS security rankings provide useful information about network hosts within a particular network, but these rankings typically are only available and used within the NPS operating environment itself.

It would be useful to provide a way for third party applications and systems to be able to access and utilize security rankings, even independently of the NPS itself. The technique of this disclosure provides such a solution.

BRIEF SUMMARY

A network protection system (NPS) is augmented to determine and apply security information for a host on a network. The NPS is configured to monitor the host. In response to an occurrence, e.g., the host requesting a network host address, the NPS dynamically determines the security information and encodes it in a portion of the IP address that is assigned, e.g., by a DHCP server. The particular portion of the IP address that is configured for the security information is identified according to variable-length subnet masking (VLSM) notation and, in particular, by including an additional host identifier subdivision that identifies the portion that carries the relevant security data. The security information (e.g., a rank) is encoded in a bitmask. An IP address that has been extended in this manner is then provided on the network, where it is readily-evaluated by other applications and systems that recover the security information by simply applying the bitmask to the IP address.

The foregoing has outlined some of the more pertinent features of the disclosed subject matter. These features should be construed to be merely illustrative. Many other beneficial results can be attained by applying the disclosed subject matter in a different manner or by modifying the subject matter, as will be described below.

BRIEF DESCRIPTION OF THE DRAWINGS

For a more complete understanding of the subject matter herein and the advantages thereof, reference is now made to the following descriptions taken in conjunction with the accompanying drawings, in which:

FIG. 10 depicts a representative Dynamic Host Configuration Protocol (DHCP) IP leave offer message that has been modified to include a security rank bitmask according to this disclosure.

DETAILED DESCRIPTION OF AN ILLUSTRATIVE EMBODIMENT

Figure 1:
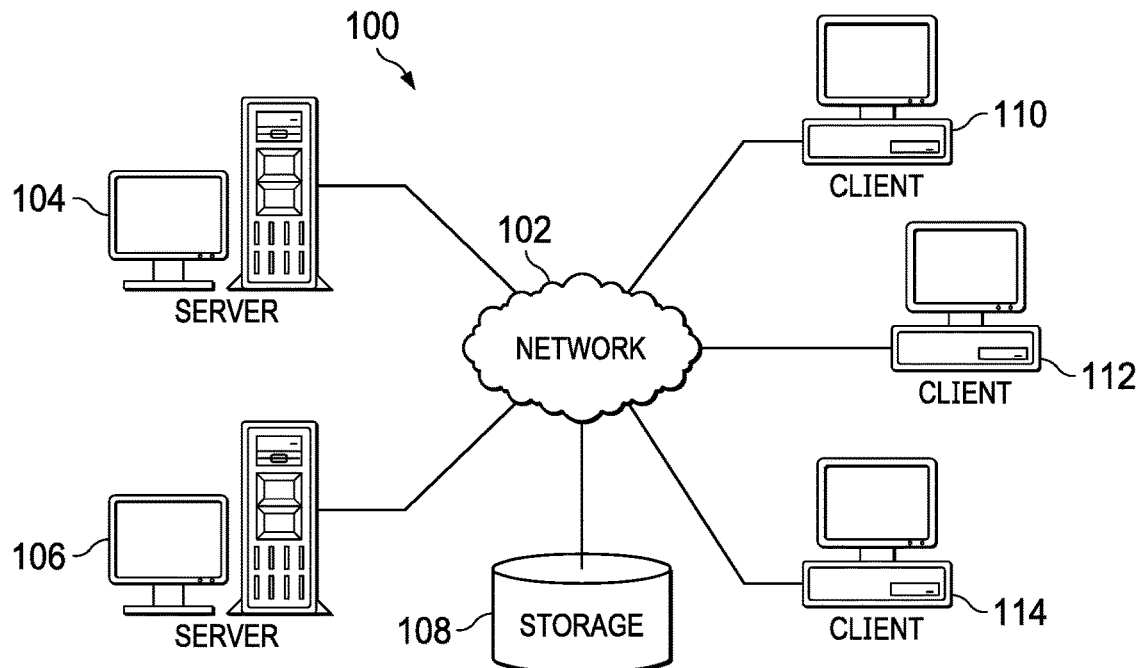
FIG. 1 depicts an exemplary block diagram of a distributed data processing environment in which exemplary aspects of the illustrative embodiments may be implemented.
Figure 2:
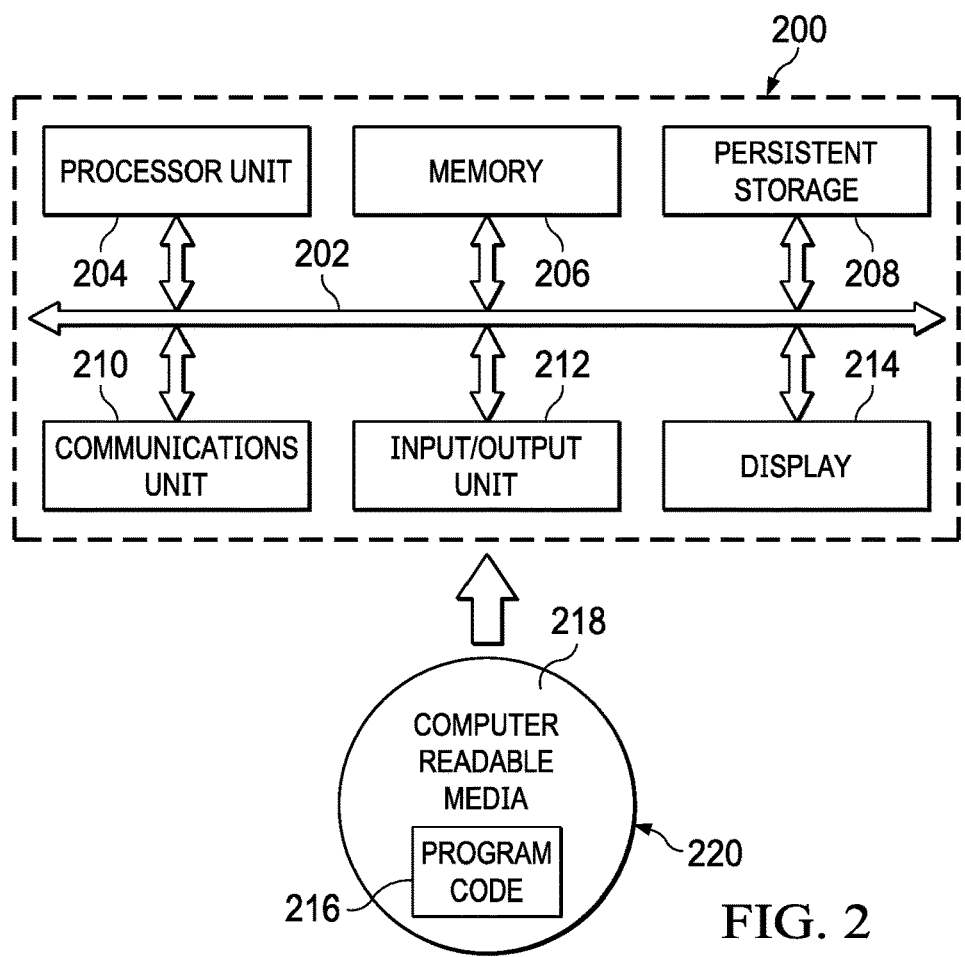
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212.

The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the symmetric multi-processing (SMP) system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

In a representative but non-limiting implementation, the techniques herein are described in the context of a transaction-processing system or environment that comprises distributed and mainframe components, working cooperatively to respond to HTTP and Web Service client end-user service or transaction requests. Such a system or environment typically comprises multiple components, configured in a distributed manner. A distributed component of a larger multi-component transaction-processing environment typically comprises at least a computer, operating system platform, applications, networking and an associated security engine that provides distributed transaction processing functions, such as networking interactions with the client end-user, and identification and authentication functions in HTTP and Web Services scenarios. The transaction-processing system or environment of this type typically also includes a mainframe component that includes at least a computer, operating system platform, applications, networking and associated security engine that provides high performance back-end transaction processing and large database functionality.

Monitored Server Security Systems

Figure 3:
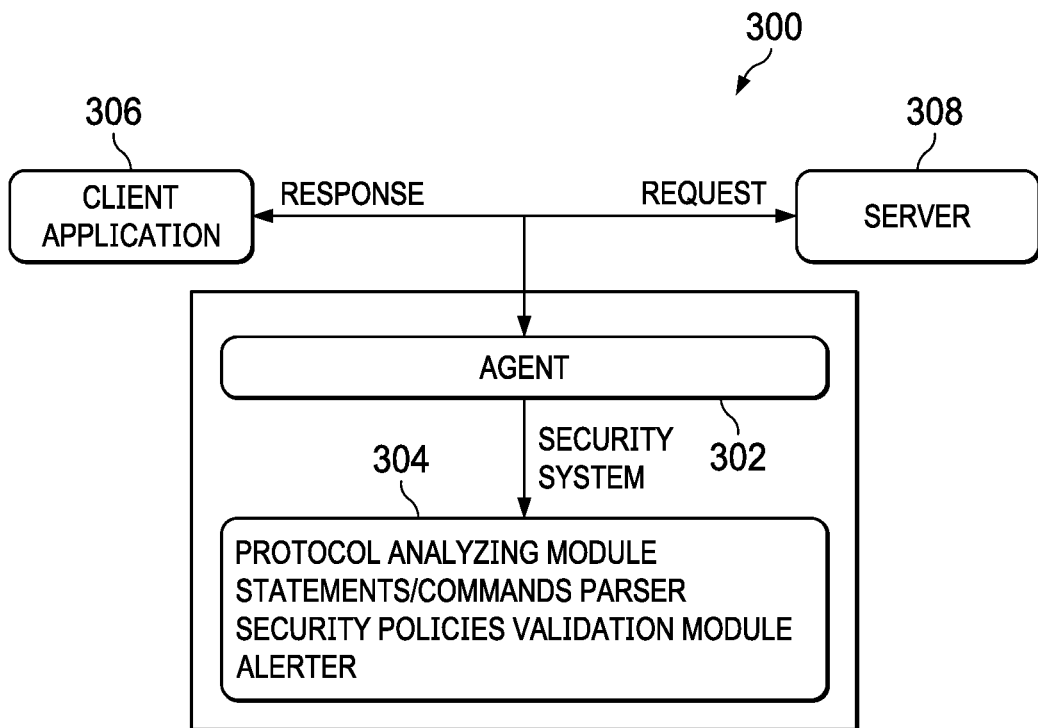
FIG. 3 depicts a generalization of a security system for monitoring a server in a client-server operating environment.

As described above, it is known to protect servers using security devices and methods, such as intrusion detection. Security systems of this type typically analyze server access attempts by monitoring a network or local access to the server. FIG. 3 depicts a general solution of this type. As depicted, in this system 300 a client application 306 interacts with a server 308, and an agent 302 (which may be a proxy, or other monitoring functionality) operates to monitor both requests (to the server) and responses (from the server). The requests and responses are forwarded to a security mechanism 304. The security mechanism 304 typically includes various components, namely, a protocol analyzer module, a statements/commands (or "statement/command") parser, a policy validation module, and a security enforcement module (e.g., an SEM). Generally, the security mechanism is configured to examine the requests and the responses, to identify anomalies, and to take action to protect the server if necessary.

In particular, the agent 302 is configured to examine the application protocol request or response. Such a request/response is represented in the form of application protocol structure. Different types of clients/servers use different application protocol and statements/commands languages, although typically the request and response flow is common. Typically, a request contains application protocol metadata. The protocol analyzing module extracts a statement/command from the request. To this end, the protocol analyzing module needs to be aware of the applicable application protocol structures. Statements/commands extracted by the protocol analyzing module are then passed to the statement/ command parser for evaluation. The statement/command parser may successfully parse the statement/command extracted by the protocol analyzing module, in which case the statement is then evaluated against one or more security policies. As also previously described, in certain situations, however, the statement/command parser cannot successfully parse the statement/command extracted by the protocol analyzing module.

In the example embodiment shown in FIG. 3, the agent 302 and security mechanism 304 comprise a network protection solution (NPS). These components need not be distinct. Typically, the connection between the client 306 and the server 308 occurs in a secure manner, preferably over SSL/TLS. The use of Secure Sockets Layer (SSL) and/or Transport Layer Security (TLS)-based encryption for network communications generally inhibits the ability to identify and mitigate threat traffic from within the network.

Figure 4:
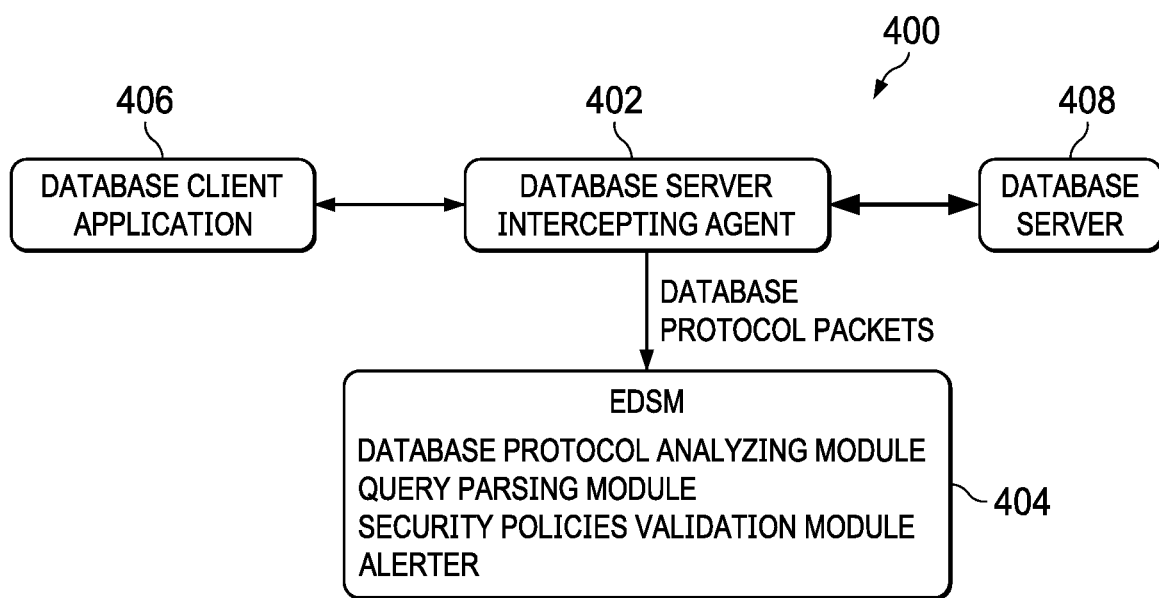
FIG. 4 depicts an access control system (e.g., for an application server) that is structured with a security mechanism in accordance with the technique shown in FIG. 3.

By way of additional background, FIG. 4 depicts the basic operation of an NPS configured as an application server access control system 400 that comprises a server intercepting agent 402 and an associated security mechanism 404. As a skilled person will appreciate, the access control system in FIG. 4 is a special case of the generalized security system architecture depicted in FIG. 3. As depicted in FIG. 4, in this embodiment the agent 402 is situated in-line between a client application 406, and an application server 408. Queries/requests initiated to the server 408 by the client application 406 are intercepted by agent 402, and application protocol packets comprising those queries/requests are forwarded to the security mechanism 404 for evaluation. In this embodiment, the intercepting agent 402 typically also monitors the responses received from the application server 408. Typically, an application protocol packet refers to a formatted unit of data used in communication between the client application and the application server. In a typical NPS, the security mechanism 404 includes several modules, e.g., an application protocol intercepting module, a protocol analyzing module, a statements/commands parsing module, a security rules validation module, and a security enforcing module (SEM). These modules typically are implemented as software executing in hardware. The intercepting module intercepts network packets. The protocol analyzing module analyzes network protocol packets on different OSI (Open Systems Interconnection) levels including the application level. The protocol analyzing module extracts metadata, statements and commands from network protocol packets. The statements/commands parser extracts information specific client application statements or command. The security rules validation module validates extracted information against security rules defined and set, e.g., by an NPS administrator, by default, or otherwise. The security enforcing module (SEM) performs configured security system actions defined by the security rules, such as alerting about security violations, blocking insecure network connections, dynamic data masking and redaction, and others.

Thus, in general the security mechanism is configured to extract application-specific information from the request sent by the client application 406 to the application server 408 and intercepted by the agent 402, parse this information, validate it (for potential application object access violations) against one of more security policies. If an access violation is detected, the security mechanism takes a given security action (e.g., a notification, a mitigation or other remediation function).

IP Addressing

By way of additional background, Classless Inter-Domain Routing (CIDR) is a method for allocating Internet Protocol (IP) addresses. According to this scheme, IP addresses consist of two groups of bits in the address, namely, (i) the most significant bits (MSBs), namely, the network prefix, which identifies a whole network or a subnet, and (ii) the least significant set that forms a host identifier, which specifies a particular interface of a host on that network. CIDR is based on a variable-length subnet masking (VLSM) technique, which allows the specification of arbitrary-length prefixes. The CIDR notation is a compact representation of an IP address and its associated routing prefix. The notation is constructed from an IP address, a slash ("/") character, and a decimal number. The number is the count of leading "1" bits in a subnet mask, with larger values indicating smaller networks. A subnet mask is a bitmask that encodes a prefix length associated with an IPv4 address, starting with a number of "1" bits equal to the prefix length, ending with "0" bits, and encoded in four-part dotted-decimal format: 255.255.255.0. A bitmask is data used for bitwise operations, particularly in a bit field; using a mask, multiple bits in a byte or word can be set either on, off or inverted from on to off (or vice versa) in a single bitwise operation.

The maximum size of the network is given by the number of addresses that are possible with the remaining, least-significant bits below the prefix. For example, in CIDR nomenclature, 192.168.100.14/24 represents the IPv4 address 192.168.100.14 and its associated routing prefix 192.168.100.0, or equivalently, its subnet mask 255.255.255.0, which has 24 leading 1-bits.

Security Rank Encoding and Propagation

With the above as background, the technique of this disclosure is now described.

Figures 5, 6, 7:
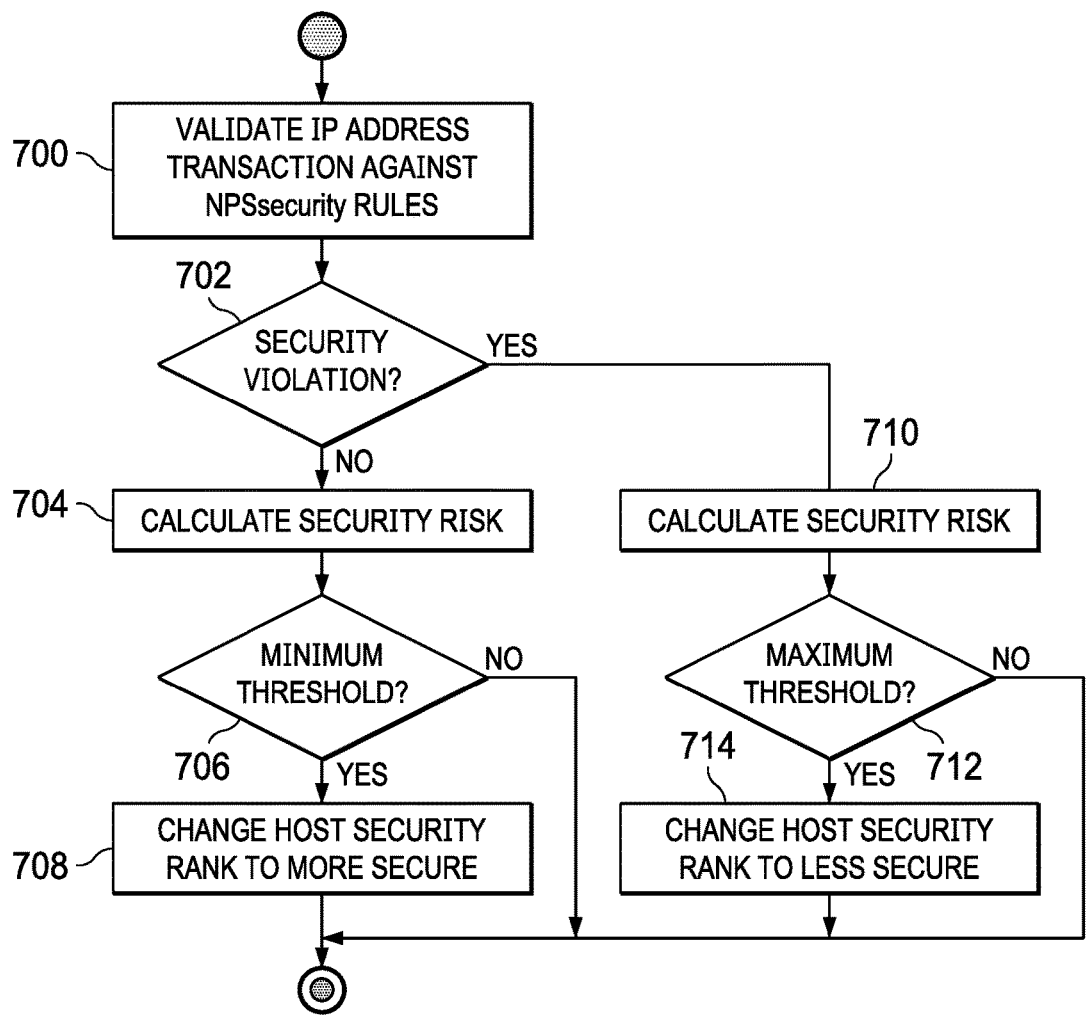
FIG. 5 depicts a representative security rank bitmask data set in a first embodiment.
FIG. 6 depicts another representative security rank bitmask data set in a second embodiment.
FIG. 7 depicts an example operation of how the NPS determines a security ranking for a transaction associated with a host.

According to this disclosure, the NPS (e.g., the SEM as depicted in FIG. 5) also is configured to calculate and propagate a monitored network host's security rank. The information that is used for this calculation varies depending on implementation, as well as the definitions that are used for the security ranks. In a representative use case, a network host security rank is based on a set of information collected by the NPS, such as average number of client authentication failures, access attempts to unauthorized servers, sites, objects or server resources, failures to update certificates and security patches, the use of insufficiently-secure cryptographic methods, failures to encrypt server communications, and many others. The NPS collects the information, determines an appropriate security rank, and associates that rank with a host's IP address. According to this disclosure, preferably the security rank is encoded in the host's IP address and thus available for propagation in the network in a manner that is now described.

As noted above, Internet Protocol addressing schemes such as IPV4 conform to standard notation. In Classless Inter-Domain Routing (CIDR) IPV4 nomenclature, for example, 255.255.255.000 represents a 24-bit subnet mask, and 192.168.100.000 is a typical network identifier (network id). Variable-Length Subnet Masking (VLSM), as defined in Internet RFC 1812, is a CIDR variant that normally is used to enable division of an IP address space into a hierarchy of subnets of different sizes. According to a preferred approach herein, VLSM notation is extended with an additional trailing host id subdivision as follows: IP addresss {xxx.xxx.xxx.xxx}/{number of host addresses within subnet}/{MSB reserved for a security ranking}. Thus, traditional IP addresses 192.168.100.14/24 and 192.168.100.142/24 represent two host ids, namely, 14 and 142; however, when the additional host id subdivision data is added according to this disclosure, the resulting IP address identifies the portion(s) of the IP address that are reserved for the security ranking (once the bitmask is applied). Thus, the following IP addresses represent examples of the extended VLSM notation according to this disclosure: 192.168.100.14/24/1 and 192.168.100.142/26/2. The inclusion of the "1" at the trailing end of the first address indicates that the first MSB of the 24-bit host id part of the IP address (namely, "0.14") is reserved to encode the security information; the inclusion of the "2" at the trailing end of the second address indicates that the second MSB of the 16-bit host id (namely, "100.xxx") is reserved for the security ranking. Of course, this examples are not intended to be limiting.

Generalizing, given portion(s) of a host id are configured (in effect, re-purposed) according to the extended VLSM notation to host the security ranking that is determined and provided by the NPS in association with its monitoring operation. Bitmasks (or, more generally, masks) are then used to encode the value(s) of the security ranks.

FIG. 5 depicts a first example scenario where the NPS provides two (2) security ranks, namely, normal and suspicious. This use case is merely representative, as a particular set of security rankings may include more than just two ranks (an example variant use case is provided below). In this example, the bitmask 0x00 is used to signify that the host is "normal" (e.g., SECURITY_NORMAL), whereas the bitmask 0x80 is used to signify that the host is "suspicious" (e.g., SECURITY_SUSPICIOUS_HOST). With these definitions, it can be seen how the host IP address is then used to encode the relevant security rank determined or provided by the NPS. In particular, consider IP address 192.168.100.14/24/1. This IP address has the security rank "normal," in particular because the host id hexadecimal value evaluates as follows: 14=0x0e→0x0e && 0x80=0x00, which in this example scenario is defined "normal." In contrast, the IP address 192.1.68.100.142/24/1 is ranked as suspicious, in particular because the host id hexadecimal value evaluates as follows: 142=0x8e→0x8e && 0x80=0x80, which in this example scenario is defined as "suspicious."

Thus, the technique herein extends variable subnet masking notation (VLSM) with the calculated security rank encoded in the host id subdivision. As noted above, it is not required that only the MSB be used for this purpose, as a variant IP address structure may be, e.g., 192.168.100.121/16/2, which means that the second MSB of the 16-bit host id (in this case 100.121) are reserved to hold (encode) the security ranking. FIG. 6 depicts four (4) representative security ranks that are encoded using this latter scheme. In particular, in this scenario, the first rank is normal (described as SECURITY_NORMAL) with a bitmask 0x00. A second rank (described as SECURITY_SUSPICIOUS_HOST) is defined by the bitmask 0x40. A third security rank (described as SECURITY_LOW_VIOLATOR) is defined by the bitmask 0x80, and a fourth security rank (described as SECURITY_HIGH_VIOLATOR) is defined by bitmask 0xC0. Thus, when NPS determines, e.g., that a particular host is suspicious, it returns the encoded value in the host's IP address, e.g., 192.168.100.121/16/2, in particular because the relevant host id hexadecimal value (the second MSB) evaluates as follows: 100=0x64 && 0xC)=0x40→suspicious.

Because the security-ranked IP address is legal, i.e., standards-compliant, the technique of this disclosure does not require changes to existing architecture, algorithms, protocols or networking methods and devices. The approach of encoding security rank data within IP addresses returned from the NPS (or other such devices) is highly advantageous, as third party application can then use the security rank information to perform various actions, all without any interaction with or knowledge about the NPS itself. There are many possible use cases. For example, an application installed on a LAN network host may perform a security check upon OS start by simply examining the host IP address information returned by the NPS; based on the security rank encoded, the application may alert the user that his or her computer is suspect for a security violation. As another example, a third party firewall (distinct from or unrelated to the NPS) is configured to check IP address security rank bits. A host found to be suspicious is then prohibited for access server-sensitive data; this operation is enabled even when the firewall has no common interface with the NPS because the checking is simply carried out with respect to the security ranking bit(s) of the IP address in incoming or outgoing IP network packets. As still another example, an email client checks the security rank IP addresses found in an email body (or otherwise) and provides an indication that a particular host (e.g., a source of the email) is suspicious.

As noted above, the above example use cases are not intended to be limiting. A particular set of security rankings may include two or more security ranks. Because source and destination IP addresses accompany all IP-based network packet transmissions, and because the security rank data is encoded in legal IP addresses, the NPS-derived security rankings may be propagating in or from any IP-based network.

FIG. 7 depicts a representative process flow how an NPS is configured to determine a security rank. In this example scenario, which is not intended to be limiting, it is assumed that the security rankings are as depicted in FIG. 6. The process begins at step 700 with the NPS SEM performing a validation operation with respect to a transaction received from a host having an IP address. That address may already include a security rank. At step 702, a test is performed to determine whether a security violation is detected. If the output of the test at step 702 is negative, the routine continues at step 704 to calculate a security risk for the transaction and then, at step 706, to determine whether the calculated security risk is below some configured minimum threshold. If the output of the test at step 706 is positive, and in this example, at step 708 the NPS changes the host security rank to a "more secure" value, encodes that value into the IP address, and outputs (propagates) the new IP address. Returning to step 702, if the output of that test is positive, however, the routine continues at step 710 to calculate a security risk for the transaction and then, at step 712, to determine whether the calculated security risk is above some configured maximum threshold. If the output of the test at step 712 is positive, and in this example, at step 714 the NPS changes the host security rank to a "less secure" value, encodes that value into the IP address, and outputs (propagates) the new IP address. If the result of either test 706 or 712 is negative, no change to the security rank is made.

Figure 8:
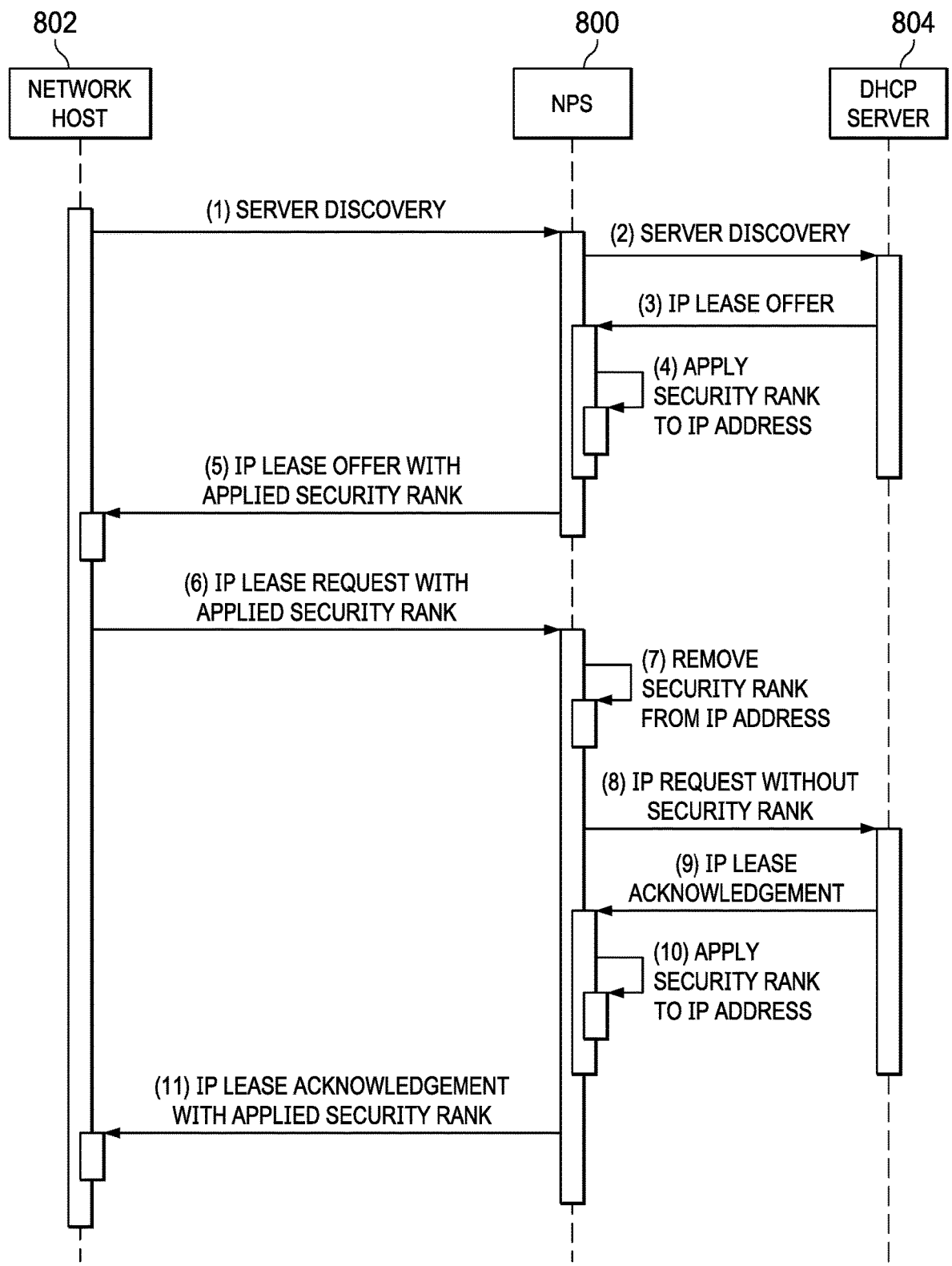
FIG. 8 depicts the dynamic assignment of a security rank encoding during a Dynamic Host Configuration Protocol (DHCP) IP address assignment process according to another embodiment of this disclosure.

FIG. 8 depicts a variant implementation scenario. In this embodiment, the NPS 800 is monitoring communications between network hosts, e.g., host 802, and a Dynamic Host Configuration Protocol (DHCP) server 804, and the security ranking is encoded dynamically as the host obtains a dynamic IP address. DHCP provides a framework for automatic configuration of IP-based network hosts. This operating scenario is not intended to be limiting. In this embodiment, the NPS 800 follows DHCP protocol rules and is operative to modify DHCP network messages on-the-fly. To this end, the NPS 800 uses dynamic masking, which is non-invasive as it does not require any changes to the DHCP server 804. As depicted, the process begins at step (1) with the network host 802 performing a discovery request to locate the DHCP server. The NPS 800 "sees" this request and at step (2) passes it along to the DHCP server 804. The DHCP server 804 responds at step (3) with an IP address lease offer (with a dynamic IP address specified). At step (4), the NPS 800 computes the security rank and applies it to the IP address provided by the DHCP server. At step (5), the NPS 800 returns the lease offer with the applied (encoded) security rank back to the network host 802. The bottom half of the drawing depicts a follow-on operation wherein the network host 902 makes the formal request for the lease (i.e. attempts to accept the lease offer). This portion of the operation begins at step (6), wherein the network host 802 makes an IP lease request with the applied security rank previously provided. At step (7), the NPS removes the security rank from the IP address and, at step (8), the NPS 800 passes the IP address request without the security rank to the DHCP server 804. The DCHP server 804 responds with an IP lease acknowledgment (and IP address) at step (9). At step (10), the NPS 800 re-applies the security rank to the IP address returned from the DHCP server. At step (11), the NPS returns the IP lease acknowledgement with the applied security rank back to the host 802. This completes the processing.

Figure 9:
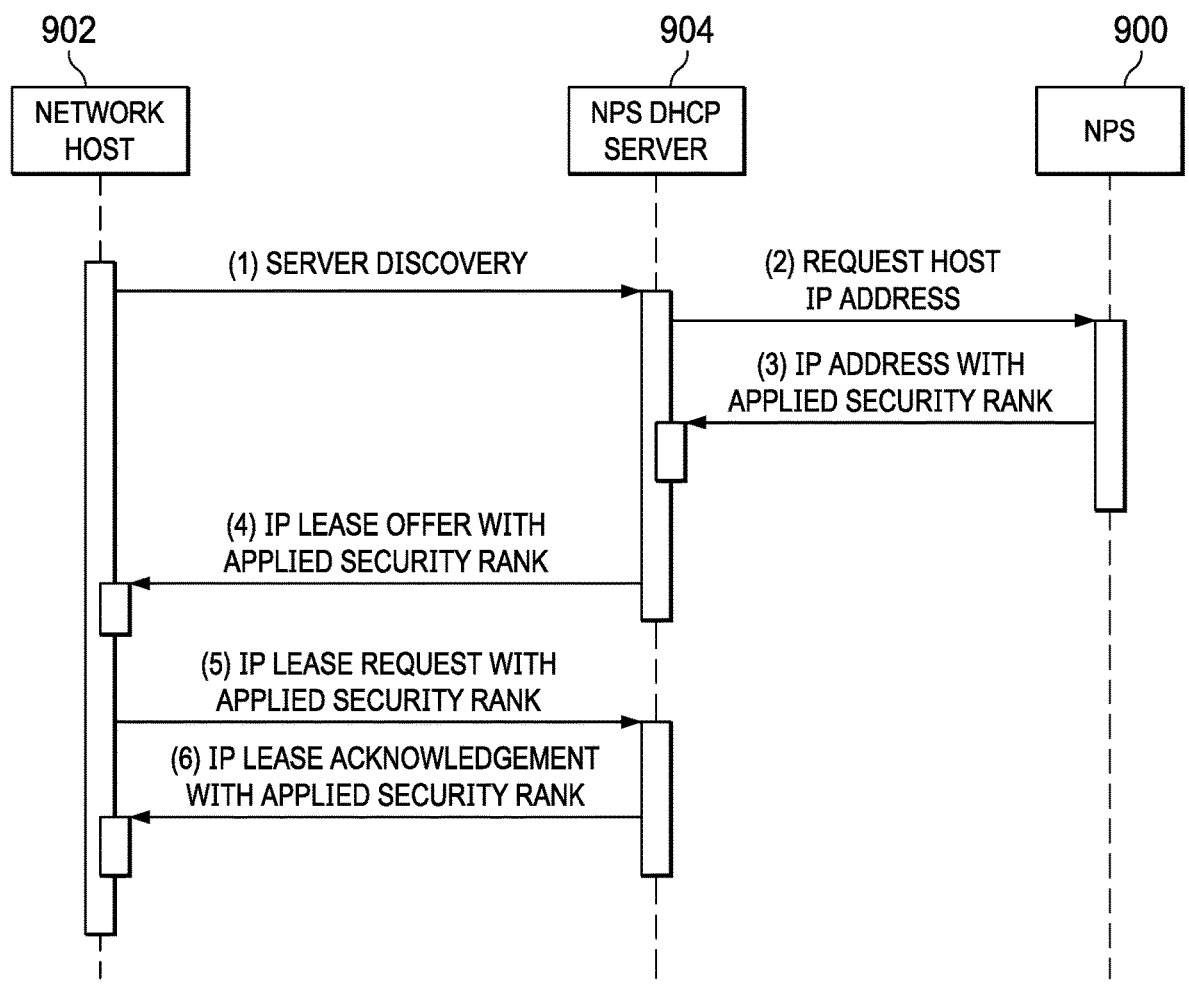
FIG. 9 depicts a further variant implementation wherein an NPS controls a Network Management Protocol Server (NMPS)

FIG. 9 depicts a further variant, wherein NPS maintains an associated DHCP server (Network Management Protocol Server (NMPS)). This scenario provides a simplified implementation (as compared to FIG. 8), as the DHCP server allocates IP addresses on-the-fly received directly from the NPS internal data structures. As depicted, the process begins with the host 902 issuing a server discovery request at step (1). At step (2), the NPS DHCP server 904 requests a host IP address from the NPS 900. The NPS determines the security rank (as previously described) and, at step (3), returns to the NPS DHCP server 904 an IP address with the security rank applied (encoded). At step (4), the DHCP server 904 returns an IP lease offer with the applied security rank embedded. At step (5), the network host 902 issues a IP lease request with the applied security rank to attempt to accept the lease offer. In response, and at step (6), the DHCP server 904 responds with the lease acknowledgement with the applied security risk.

FIG. 10 depicts a representative DHCP IP lease offer DHCP message (step (5) in FIG. 8, step (4) in FIG. 9). In this example, the DHCP server host offers lease address 192.168.1.100. The YIADDR is a 32-bit field, and it is shown as having been modified by NPS as described above to apply (encode) one of the security bitmasks defined in FIG. 6, namely, the value "1.100" indicating that the host is "suspicious." This IP address (with applied security rank) may then be propagated to one or more third party applications, processes, devices, or machines.

The above-described techniques for dynamically-inserting security information into IP addresses during dynamic IP address allocation is not intended to be limiting. The security information may be asserted statically and/or in association with other IP address allocation operations. Irrespective of when the security rank is encoded in an IP address, because of the ubiquitous nature of IP addressing, the security ranks are then publicly available on the network to whatever source might then use them.

Figure 11:
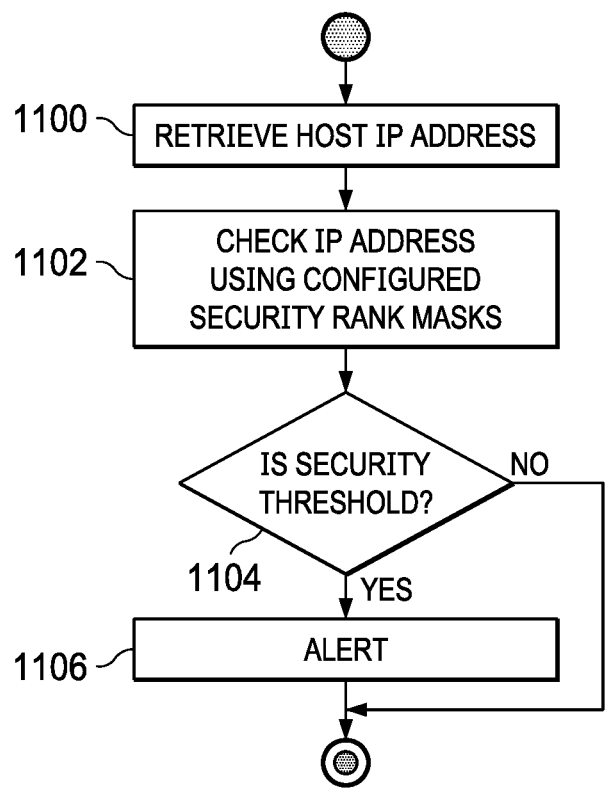
FIG. 11 depicts how a third party application or system processes an IP address that has an applied security ranking.

FIG. 11 depicts a process flow showing how a third party application processes an IP address with applied security rank propagated in this manner. The routine begins at step 1100 with the third party application retrieving the host IP address. As noted above, the host IP address accompanies all IP-based network packets, so it is readily available to the application. At step 1102, the third party application checks the IP address using the configured security rank masks. At step 1104, a test is performed to determine whether a particular security threshold has been met. If not, the routine continues with no action taken. If, however, the security threshold is met or exceeded, the routine branches to step 1106 and performs an action, e.g., issuing an alert. The nature and type of action may vary of course. Representative actions include, without limitation, alerting, sandboxing, mitigation, remediation, and the others.

As one example, assume that a program installed on a LAN host can locally verify host IP address security rank after operating system (OS) start, and then alert the OS user that his or her computer is suspected for security violations (e.g., "Company security policy is violated using host xxxyyy.com (192.168.100.142); this security problem will be investigated"). In contrast, if the host IP address security rank is locally verified, the user might receive an affirmative message, e.g., "Security Note: Company security policy has approved host xxx.yyy.com (192.168.100.14)." As another example, assume a third party firewall (not associated with the NPS) is configured to check IP address security rank bits received from a client host and that are configured in the manner described above. If (based on the security rank bit) the server that is the target of a client request is suspected of being in violation of a security policy, the client host is not allowed access to the suspected server (or vice versa if the security rank bit check passes). In this example, there is no requirement for the firewall to have any common interface with the NPS; rather, the firewall simply checks the security rank bit of the IP address in the incoming and outgoing IP network packets. The technique is readily implemented, as network applications on a host automatically expose a host IP address merely by communicating via the Internet Protocol (IP).

Another example scenario is an email client that is configured to check security rank IP addresses found within an email body, and then to provide an alert or message (or some other indication) that the body includes a suspected host. The alert may distinguish suspect IP addresses from those that are not suspicious, perhaps by providing the suspect addresses in a different color or font, or providing some other visual indicator to the user. Another example may involve an Internet Service Provider (ISP) that assigns unique IP addresses to a customer's cable modem providing the user with dynamic configuration settings (addresses that include the security rank bits as provided herein) that are public on the Internet and thus available to be checked.

Generalizing, and as the various checking scenarios described above make clear, the technique herein is not limited to any particular type of monitoring associated with a host, or any particular type of use case. Upon a determination of suspicious behavior associated with the network host, the security ranking data is attributed to the monitored host in the manner described so that other systems, devices, applications, processes and programs in a network receive information about that suspicious behavior in an efficient, reliable and scalable manner.

The subject matter herein provides numerous advantages. The approach is simple to implement, as all that is required is that the NPS be configured to apply the security rank information into an IP address. The NPS operates in its usual manner to monitor and validate network host transactions against NPS security rules. Using the technique herein, the NPS is further configured to assign the security rank to a network host, preferably in the form of a bitmask, with the host security rank bitmask preferably being a function of a detected security violation (or, more generally, some security-related condition, state, or event). The technique is simple to implement, e.g., with the monitored network host requesting an IP address and an NMPS server dynamically allocating the host IP address upon request, in which case the NPS simply adds the security rank bitmask into an allocated IP address host id before the monitored host accepts the IP address. In this embodiment, the NPS controls traffic between the network host and the NMPS server and inserts the security rank bitmask into the IP address host octet or octets on-the-fly. In this manner, the dynamically-allocated host IP address then contains the security rank assigned by NPS, and that security rank is propagated throughout the network. As noted, the approach herein does not require structural changes on an existing network having these components, and the technique enables third party applications and system to read and respond to security ranks without any interfaces (e.g. APIs) dedicated for this purpose; indeed, the third party applications and systems simply retrieve network host IP address from any received packet and then check the bitmask for the configured security rank. The approach works irrespective of whether the host is on the same network segment as the application that checks the IP address-propagated security rank. In a preferred approach, the security rank bitmask propagation is used when the NPS controls network management protocol servers although, as noted above, this operating scenario is not intended to be limiting.

Generalizing, the enhanced NPS functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. As noted, the techniques herein may be practiced in a loosely-coupled server (including a "cloud"-based) environment. The security server itself (or functions thereof, such as the monitor process) may be hosted in the cloud.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the analytics engine functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

In a representative embodiment, the NPS, or the agent and security mechanism components, as the case may be, are implemented in a special purpose computer, preferably in software executed by one or more processors. The software is maintained in one or more data stores or memories associated with the one or more processors, and the software may be implemented as one or more computer programs. Collectively, this special-purpose hardware and software comprises the NPS (or agent/security mechanism) described above.

While the above describes a particular order of operations performed by certain embodiments of the disclosed subject matter, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques disclosed herein are not limited to a multi-component transaction processing environment, but this will be a typical implementation. As noted, the above-described function may be used in any system, device, portal, site, or the like wherein server-set session management data might be re-used (either by an original user in a different session, or by another user) through the same client browser.

The technique described herein is not limited for use with any particular network protection mechanism or application protocol, and it may be applied in other access control schemes generally. Thus, while the depicted approach is a preferred operating environment, the approach may be implemented in any application access scheme wherein client requests are processed for potential security violations in the manner described.

The techniques herein provide for improvements to another technology or technical field, namely, access control systems, as well as improvements to the operational capabilities of such systems when used in the manner described.

The technique herein of providing security rankings within IP addresses may be extending to provide other security-related information including, without limitation, reputation data, machine-generated data, or the like.

Having described the subject matter above, what we claim is as follows:

The invention claimed is:

1. A method to associate security information with a host on a network, comprising:
   monitoring the host;
   determining the security information for the host, wherein the security information is a security rank associated to the host, the host being associated with an Internet Protocol (IP) address;
   modifying the IP address by extending a length of the IP address to include the determined security information according to variable-length subnet masking (VLSM) notation as an additional host identifier subdivision to identify a portion of the IP address that encodes the determined security information; and
   providing the extended IP address on the network.

2. The method as described in claim 1 wherein the security rank is one of a set of security rankings assignable to the host.

3. The method as described in claim 1 wherein the security information is encoded in a bitmask.

4. The method as described in claim 1 wherein the extended IP address is distributed upon receipt of a request for a network host address.

5. The method as described in claim 4 wherein the security information is determined dynamically upon receipt of the request for the network host address.

6. Apparatus for associating security information with a host on a network, comprising:
   a processor device;
   computer memory holding computer program instructions executed by the processor device to associate the security information with the host on the network, the computer program instructions comprising program code configured to:
   monitor the host;
   determine the security information for the host, wherein the security information is a security rank associated to the host, the host being associated with an Internet Protocol (IP) address;
   modify the IP address by extending a length of the IP address to include the determined security information according to variable-length subnet masking (VLSM) notation as an additional host identifier subdivision to identify a portion of the IP address that encodes the determined security information; and
   provide the extended IP address on the network.

7. The apparatus as described in claim 6 wherein the security rank is one of a set of security rankings assignable to the host.

8. The apparatus as described in claim 6 wherein the security information is encoded in a bitmask.

9. The apparatus as described in claim 6 wherein the extended IP address is distributed upon receipt of a request for a network host address.

10. The apparatus as described in claim 9 wherein the program code determines the security information dynamically upon receipt of the request for the network host address.

11. A computer program product embodied in a non-transitory computer readable medium, the computer program product holding computer program instructions executed by a data processing system to associate security information with a host on a network, the computer program instructions comprising program code configured to:
    monitor the host;
    determine the security information for the host, wherein the security information is a security rank associated to the host, the host being associated with an Internet Protocol (IP) address;
    modify the IP address by extending a length of the IP address to include the determined security information according to variable-length subnet masking (VLSM) notation as an additional host identifier subdivision to identify a portion of the IP address that encodes the determined security information; and
    provide the extended IP address on the network.

12. The computer program product as described in claim 11 wherein the security rank is one of a set of security rankings assignable to the host.

13. The computer program product as described in claim 11 wherein the security information is encoded in a bitmask.

14. The computer program product as described in claim 11 wherein the extended IP address is distributed upon receipt of a request for a network host address.

15. The computer program product as described in claim 14 wherein the program code determines the security information dynamically upon receipt of the request for the network host address.

16. A computing system associated with a host, the host executing at an Internet Protocol (IP) address on a network, the system comprising:
    an application comprising program code stored in computer memory and executed by a hardware processor, the program code configured to:
    retrieve the IP address of the host, the IP address having been extended according to variable-length subnet masking (VLSM) notation as an additional host identifier subdivision to identify a portion of the IP address that encodes a security rank associated to the host;
    apply a bitmask to the extended IP address to recover the security rank associated to the host; and
    take a given security action based on the recovered security rank.

17. The computing system as described in claim 16 further including network protection system (NPS) program code stored in a computer memory and executed by a hardware processor, the NPS program code configured to determine the security rank, and to encode the security rank into the IP address.

18. The computing system as described in claim 16 wherein the NPS is configured to dynamically determine and encode the security rank in response to receipt from the host of a request for a network host address.

* * * * *